US008502758B2

(12) United States Patent
Beland et al.

(10) Patent No.: US 8,502,758 B2
(45) Date of Patent: Aug. 6, 2013

(54) APPARATUS AND METHOD FOR MAPPING VIRTUAL PIXELS TO PHYSICAL LIGHT ELEMENTS OF A DISPLAY

(75) Inventors: Graham N. Beland, Wellsville, UT (US); James Blake Gover, Las Vegas, NV (US); Clifford B. Brown, Smithfield, UT (US); Brent W. Brown, Farmington, UT (US)

(73) Assignee: Young Electric Sign Company, Salt Lake City, UT (US)

( * ) Notice: Subject to any disclaimer, the term of this patent is extended or adjusted under 35 U.S.C. 154(b) by 859 days.

(21) Appl. No.: 12/635,636

(22) Filed: Dec. 10, 2009

(65) Prior Publication Data

US 2011/0140999 A1  Jun. 16, 2011

(51) Int. Cl.
*G09G 3/32* (2006.01)

(52) U.S. Cl.
USPC ............................... 345/83; 345/55; 345/82

(58) Field of Classification Search
None
See application file for complete search history.

(56) References Cited

U.S. PATENT DOCUMENTS

| | | | |
|---|---|---|---|
| 5,949,581 A * | 9/1999 | Kurtenbach et al. | 359/621 |
| 5,986,399 A | 11/1999 | Van Veen et al. | |
| 6,661,429 B1 | 12/2003 | Phan | |
| 6,867,549 B2 | 3/2005 | Cok et al. | |
| 6,903,754 B2 | 6/2005 | Elliott | |
| 6,937,217 B2 | 8/2005 | Klompenhouwer et al. | |
| 6,950,115 B2 | 9/2005 | Elliott | |
| 7,030,893 B2 | 4/2006 | Yang | |
| 7,042,537 B2 | 5/2006 | Kanazawa et al. | |
| 7,123,277 B2 | 10/2006 | Elliott et al. | |
| 7,215,347 B2 | 5/2007 | Phan | |
| 7,274,383 B1 | 9/2007 | Elliot | |
| 7,283,142 B2 | 10/2007 | Credelle et al. | |
| 7,307,646 B2 | 12/2007 | Elliott | |
| 7,352,374 B2 | 4/2008 | Elliott et al. | |
| 7,417,648 B2 | 8/2008 | Credelle | |
| 7,420,577 B2 | 9/2008 | Elliott | |
| 7,682,043 B2 * | 3/2010 | Malstrom et al. | 362/249.11 |
| 7,880,698 B2 * | 2/2011 | Park et al. | 345/82 |
| 7,907,133 B2 * | 3/2011 | Joffer et al. | 345/204 |
| 8,111,208 B2 * | 2/2012 | Brown | 345/1.3 |
| 2002/0167465 A1 * | 11/2002 | Okuno et al. | 345/55 |
| 2003/0128225 A1 | 7/2003 | Credelle et al. | |
| 2004/0150651 A1 | 8/2004 | Phan | |
| 2004/0239813 A1 | 12/2004 | Klompenhouwer | |
| 2005/0178034 A1 | 8/2005 | Schubert | |
| 2006/0055642 A1 | 3/2006 | Daughenbaugh et al. | |
| 2008/0030527 A1 | 2/2008 | Namie | |
| 2008/0225143 A1 | 9/2008 | Joffer et al. | |

* cited by examiner

OTHER PUBLICATIONS

Extended European Search Report for corresponding European Application No. EP 10194581.4, dated Mar. 29, 2012.

*Primary Examiner* — Jason Olson
(74) *Attorney, Agent, or Firm* — TraskBritt

(57) ABSTRACT

Methods and displays are disclosed for presenting media content on display systems. A display is configured as an array of LEDs. The array of LEDs includes a first set of rows including first LEDs in a repeating pattern of a first color LED, a second color LED, and a third color LED. A second set of rows includes second LEDs in a repeating pattern of the first color LED, the second color LED, and the third color LED, wherein the second set of rows are interleaved between the first set of rows and the second LEDs are offset relative to the first LEDs. Visual content to be presented on the display includes a repeating sequence of four frames of an array of virtual pixels such that each virtual pixel of the array comprises at least one of the first LEDs and at least one of the second LEDs.

41 Claims, 10 Drawing Sheets

APPARATUS AND METHOD FOR MAPPING VIRTUAL PIXELS TO PHYSICAL LIGHT ELEMENTS OF A DISPLAY

BACKGROUND

1. Field of the Invention

The present invention relates generally to displaying images, and more specifically, to displaying images on electronic display boards and electronic billboards.

2. State of the Art

Billboards and large signs have been used for many years to convey information to a passerby such as advertising, traffic messages, and the like. Traditionally these signs and billboards were only capable of delivering a single message or advertisement. This message was generally printed on strips of paper that were then adhered to the billboard. To change the message, new paper needed to be printed and adhered to the billboard.

More recently, display boards and billboards have become electronic, using lights, light emitting diodes (LEDs), and other electronic devices to display visual content that can be easily adaptable to display a wide variety of messages in the form of words and images from the same sign without having to physically change the characteristics of the sign. These electronic boards can easily modify a graphic image or message to create video displays and modify the type of message or advertisement that is shown on the electronic board at regular intervals, or at targeted times depending on expected traffic near the sign, or public interest. These possible images are generally referred to herein as visual content.

For conventional billboards, the visual content is delivered to the physical location and affixed to the billboard. With electronic displays, the visual content must still be delivered to the physical location, but the content delivery may be performed electronically. In addition, while traditional billboards may display the same message for weeks or months at a time, electronic displays enable the message to be changed easily and often. Thus, it may be possible to modify the visual content many times in a single day. Furthermore, electronic displays may be networked together such that the displays may communicate with each other, or with a central computer.

As signs get larger, have higher pixel densities, and display richer visual content, there is a need for presenting this rich visual content accurately, cost effectively, and in a perceptibly pleasing manner.

SUMMARY

The present invention, in a number of embodiments, provides systems and methods for presenting visual content on large displays by creating virtual pixels that share pixel information among shared LEDs to define an apparent resolution for that content that is higher than the actual resolution of the physical pixels.

One embodiment is a method of presenting visual information on an LED display board. The method includes mapping an output canvas image including an array of virtual pixels to the LED display board including interleaved rows of LEDs. Odd LED rows are offset relative to even LED rows by about one-half the distance between adjacent LEDs in the interleaved rows of LEDs. Each of the odd LED rows and the even LED rows comprise a repeating pattern of a first color LED, a second color LED, and a third color LED. The method further includes combining at least two frames of a repeating sequence of four frames of the output canvas image to generate a presentation image. Within the four frames, a first frame and a second frame of the four frames include alternating pixels from odd virtual rows of the output canvas image and a third frame and a fourth frame of the four frames include alternating pixels from even virtual rows of the output canvas image. The method also includes presenting the presentation image on the LED display board.

Another embodiment is a method of presenting visual information on an LED display board. The method includes mapping an output canvas image including an array of virtual pixels to the LED display board including interleaved rows of LEDs. Odd LED rows of the interleaved rows of LEDs are offset relative to even LED rows of the interleaved rows of LEDs by about one-half the distance between adjacent LEDs in the interleaved rows of LEDs. Each of the odd LED rows and the even LED rows include a repeating pattern of a first color LED, a second color LED, and a third color LED. The method also includes presenting a repeating sequence of four frames of the output canvas image on the LED display board. A first frame and a second frame of the four frames include alternating pixels from odd virtual rows of the output canvas image. A third frame and a fourth frame of the four frames include alternating pixels from even virtual rows of the output canvas image.

Another embodiment is a display configured as an array of LEDs including rows of LEDs. The array of LEDs includes a first set of rows in a first direction including first LEDs in a first repeating pattern of a first color LED, a second color LED, and a third color LED. A second set of rows in the first direction includes second LEDs in a second repeating pattern including the first color LED, the second color LED, and the third color LED. The second set of rows are interleaved between the first set of rows and the second LEDs are offset in the first direction relative to the first LEDs. Visual content to be presented on the display includes a repeating sequence of four frames of an array of virtual pixels such that each virtual pixel of the array includes at least one of the first LEDs and at least one of the second LEDs.

Another embodiment is a display configured as an array of LEDs including rows of LEDs. The array of LEDs includes a first set of rows in a first direction including first LEDs in a first repeating pattern of a first color LED, a second color LED, and a third color LED. A second set of rows in the first direction includes second LEDs in a second repeating pattern including the first color LED, the second color LED, and the third color LED. The second set of rows are interleaved between the first set of rows and the second LEDs are offset in the first direction relative to the first LEDs. Visual content to be presented on the display includes a repeating sequence of four frames of an array of virtual pixels such that each of the first LEDs is included in a virtual pixel in each of the four frames and each of the second LEDs is included in a virtual pixel in two of the four frames.

Another embodiment is a display configured as an array of LEDs including rows of LEDs. The array of LEDs includes a first set of rows in a first direction including first LEDs in a first repeating pattern of a first color LED, a second color LED, and a third color LED. A second set of rows in the first direction includes second LEDs in a second repeating pattern including the first color LED, the second color LED, and the third color LED. The second set of rows are interleaved between the first set of rows and the second LEDs are offset in the first direction relative to the first LEDs. Visual content to be presented on the display includes a repeating sequence of four frames of an array of virtual pixels such that each of the first LEDs is included in a virtual pixel in three of the four frames and each of the second LEDs is included in a virtual pixel in three of the four frames.

Yet another embodiment is a display configured as an array of LEDs including rows of LEDs. A plurality of LED boards are configured to be abutted in a first direction to form an LED display. Each LED board of the plurality includes a first corrugated side and a second corrugated side on an opposite side from the first corrugated side, wherein the first corrugated side of even LED boards are configured to abut to the second corrugated side of odd LED boards. Each LED board also includes an array of LEDs including a first set of rows in the first direction comprising a first repeating pattern of a first color LED, a second color LED, and a third color LED and a second set of rows in the first direction comprising a second repeating pattern of the first color LED, the second color LED, and the third color LED. A first LED of the first set of rows is positioned substantially near a ridge of the first corrugated side and a last LED of the first set of rows is positioned substantially near a furrow of the second corrugated side. In addition, a first LED of the second set of rows is positioned substantially near a furrow of the first corrugated side and a last LED of the second set of rows is positioned substantially near a ridge of the second corrugated side.

BRIEF DESCRIPTION OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings, in which:

DETAILED DESCRIPTION

Figure 1:
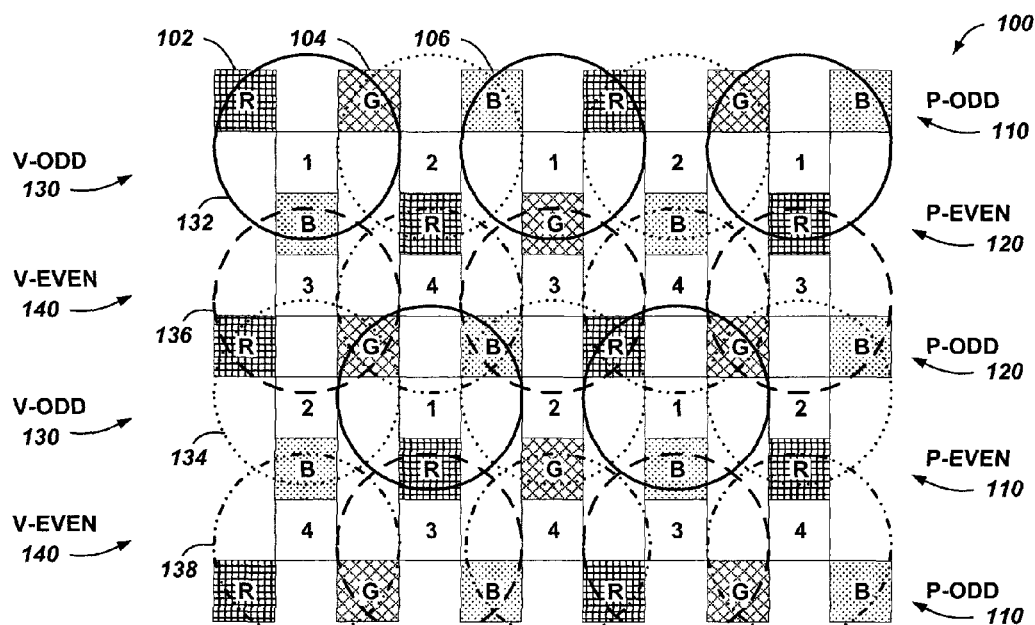
FIG. 1 illustrates a virtual pixel to physical LED mapping on an LED display board for one or more embodiments of the present invention.

In the following description, elements, circuits, and functions may be shown in block diagram form in order not to obscure the present invention in unnecessary detail. Conversely, specific implementations shown and described are exemplary only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

Furthermore, in this description of embodiments of the invention, reference is made to the accompanying drawings that form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is not to be taken in a limiting sense, and the scope of the present invention is defined only by the appended claims.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Those of skill in the art would further appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and steps are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the invention described herein.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process is terminated when its acts are completed. A process may correspond to a method, a function, a procedure, a subroutine, a subprogram, etc. Furthermore, the methods disclosed herein may be implemented in hardware, software, or both.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. Some non-limiting examples of computer-readable media are Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of storage medium known in the art that can be used to carry or store desired program code in the form of instructions or data structures and that can be accessed by a computer. A storage medium is coupled to the processor such that the processor can read information from, and write information to, the storage medium. In the alternative, the storage medium may be integral to the processor. The processor and the storage medium may reside in an ASIC.

If software is transmitted from a website, server, or other remote source using a communication medium such as a coaxial cable, fiber optic cable, twisted pair, digital subscriber line (DSL), or wireless technologies such as infrared, radio, and microwave, then the communication medium is included in the definition of computer-readable medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

The present invention, in a number of embodiments, provides systems and methods for presenting media content on large displays by creating virtual pixels that share pixel information amongst shared LEDs to define an apparent resolution for that content that is higher than the actual resolution of the physical pixels.

FIG. 1 illustrates a virtual pixel to physical LED mapping on an array of LEDs 100 for one or more embodiments of the present invention. Generally, pixels may include different discrete color sub-pixels for generating a merged pixel that appears as almost any color in the visible spectrum. Different colors may be merged to generate a color pixel. As a non-limiting example, a common combination of discrete colors is to use red, green, and blue elements to generate a merged color pixel. Thus, LED display boards described herein mostly merge the colors from red LEDs, green LEDs, and blue LEDs to form color pixels. However, those of ordinary skill in the art will recognize that other colors for the LEDs may be used. Furthermore, the descriptions herein generally describe three LEDs, one each of red, green, and blue to form a pixel. However, other embodiments may include multiple LEDs of some colors, such as, for example, one red LED, one blue LED, and two green LEDs.

FIG. 1 illustrates interleaved rows of LEDs as odd LED rows (P-ODD, 110) and even LED rows (P-EVEN, 120). In the embodiment of FIG. 1, the LEDs in the odd LED rows 110 are arranged in a repeating pattern of red LEDs 102, green LEDs 104, and blue LEDs 106. Similarly, the LEDs in the even LED rows 120 are arranged in a repeating pattern of red LEDs 102, green LEDs 104, and blue LEDs 106. The LEDs in the even LED rows 120 are offset (i.e., staggered) relative to the LEDs in the odd LED rows 110 such that each LED in the even LED rows 120 is about midway between neighboring pixels in neighboring odd LED rows 110. For example, a blue LED 106 in any given even LED row 110 is about midway between the neighboring red LED 102 and the neighboring green LED 104 in the odd LED row 110 above and the odd LED row 110 below the even LED row 120.

One aspect of the present invention is to present visual content with an apparent resolution that is higher than the actual resolution of the array of LEDs 100. This increased apparent resolution is accomplished by sharing physical LEDs between different virtual pixels in different frames of the visual content.

In conventional displays, each pixel includes a dedicated red sub-pixel, a dedicated green sub-pixel, and a dedicated blue sub-pixel. For example, visual content that has 1280 pixels by 720 pixels for a total of 921,600 pixels would require three time that many sub-pixels (i.e., 2,764,800 sub-pixels). In LED display boards, providing so many LEDs can get very expensive. Embodiments of the present invention reduce the number of LEDs required by sharing sub-pixels, while still presenting images that are at or near in quality to displays with dedicated sub-pixels.

In FIG. 1, virtual pixels are shown as boxes with a number therein and positioned between three adjacent physical LEDs, which are encircled by a circle with a different line pattern for virtual pixels belonging to different frames. Each virtual pixel is presented during a specific frame of the visual content as represented by the number in the box for the virtual pixel. In the embodiment of FIG. 1, there is a set of four sequentially repeating frames that are presented through time. Frame rates may vary widely depending on the type of visual content to be presented. Some non-limiting examples for frame rates are 5, 10, 15, 24, 30, 60, and 72 frames/second.

Figure 2A:
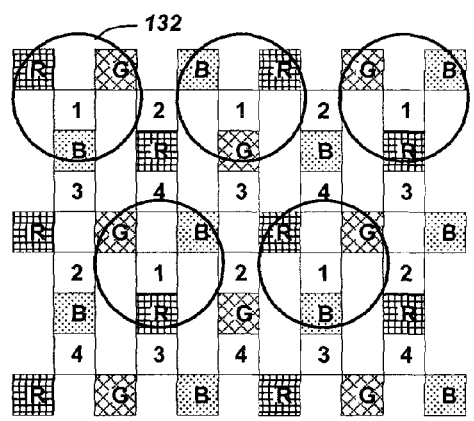
FIGS. 2A-2D illustrate individual frame virtual pixels for the mapping of FIG. 1.
Figure 2B:
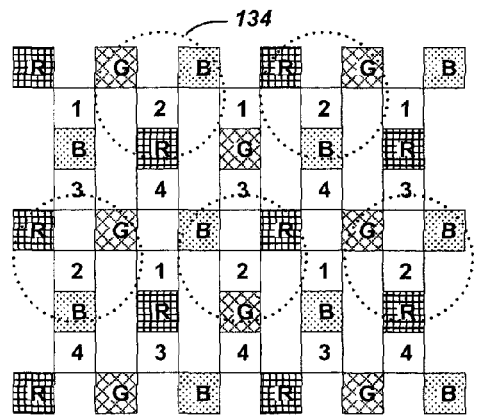
Figure 2C:
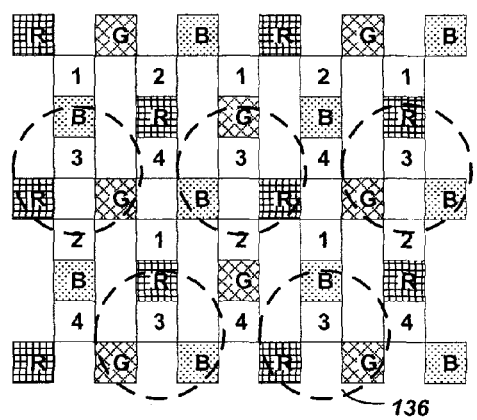
Figure 2D:
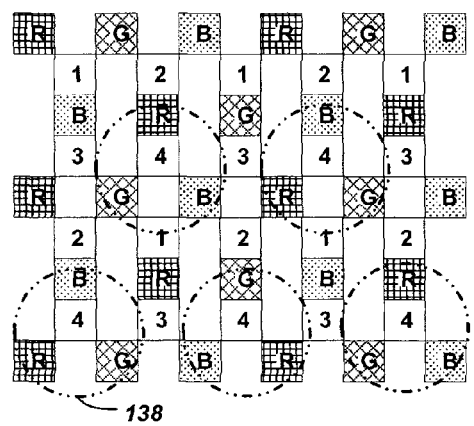

FIGS. 2A-2D illustrate individual frame virtual pixels for the mapping of FIG. 1. FIG. 2A illustrates the first virtual pixels 132 of the first frame and their mapping to physical LEDs. FIG. 2B illustrates the second virtual pixels 134 of the second frame and their mapping to physical LEDs. FIG. 2C illustrates the third virtual pixels 136 of the third frame and their mapping to physical LEDs. FIG. 2D illustrates the fourth virtual pixels 138 of the fourth frame and their mapping to physical LEDs.

Thus, as illustrated in FIG. 1 and seen more clearly in FIGS. 2A-2D, first virtual pixels 132 are in odd virtual rows (V-ODD, 130), second virtual pixels 134 are in odd virtual rows 130, third virtual pixels 136 are in even virtual rows (V-EVEN, 140), and fourth virtual pixels 138 are in even virtual rows 120. First virtual pixels 132 and second virtual pixels 134 alternate in the odd virtual rows 130. Similarly, third virtual pixels 136 and fourth virtual pixels 138 alternate in the even virtual rows 120.

In other words, in every frame 1, odd virtual rows 130 are displayed with first virtual pixels 132. In every frame 2, odd virtual rows 130 are displayed with second virtual pixels 134. In every frame 3, even virtual rows 140 are displayed with third virtual pixels 136. Finally, in every frame 4, even virtual rows 140 are displayed with fourth virtual pixels 138.

One noticeable characteristic of this virtual pixel to physical LED mapping is the usage of the physical LEDs. Each physical LED in the odd LED rows 110 gets mapped to a virtual pixel in each of the four virtual frames. For example, looking at the middle odd LED row 110, each LED is circled by virtual pixels from each of the four frames.

In contrast, each physical LED in the even LED rows 120 gets mapped to a virtual pixel in two out of the four virtual frames. For example, in the first even LED row 120, the first blue LED is used in frames 1 and 3, the first red LED is used in frames 2 and 4, the first green LED is used in frames 1 and 3, and the second blue LED is used in frames 2 and 4.

This usage may lead to a difference in lifetime for the LEDs. As a result, control logic for an LED display board may occasionally change the definition of even rows and odd rows to better balance the usage of the LEDs. Furthermore, the definition of odd and even for both the physical LED rows and the virtual rows is completely arbitrary. For example, an array may start with a row number zero and would therefore have the first row as an even row, whereas an array starting with a row number one would have the first row as an odd row.

In another way to describe the virtual pixel to physical LED mapping, during frames 1 and 2, the virtual pixels include LEDs from the odd and even physical rows with a repeating pattern including a pixel of $^R_B{}^G$, a pixel of $^B{}^R_G$, and a pixel of $^G_B{}^R$. During frames 3 and 4, the virtual pixels include LEDs from the odd and even physical rows with a repeating pattern including a pixel of $_R{}^B_G$, a pixel of $_B{}^G_R$, and a pixel of $_G{}^B_R$.

Figure 3:
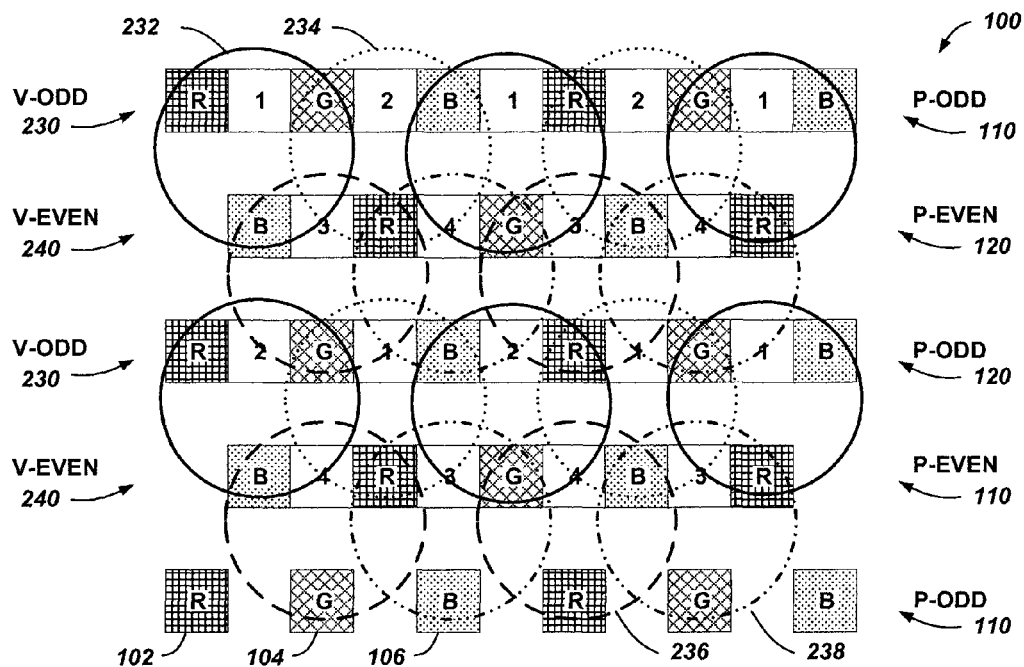
FIG. 3 illustrates another virtual pixel to physical LED mapping on an LED display board for one or more embodiments of the present invention.

FIG. 3 illustrates another virtual pixel to physical LED mapping on an LED display board for one or more embodiments of the present invention. In FIG. 3, the physical LED layout is the same as that of FIG. 1. However, in FIG. 3, the mapping of virtual pixels onto these physical LEDs is different.

Figure 4A:
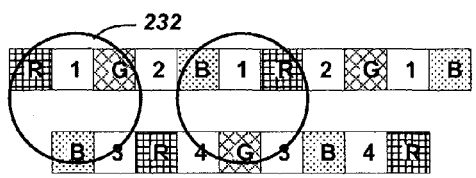
FIGS. 4A-4D illustrate individual frame virtual pixels for the mapping of FIG. 3.
Figure 4B:
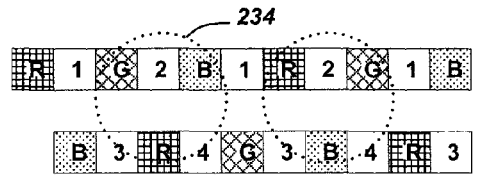
Figure 4C:
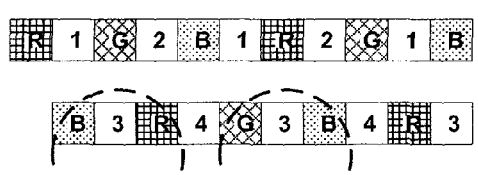
Figure 4D:
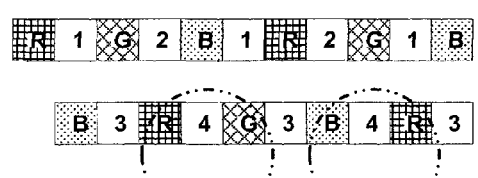

FIGS. 4A-4D illustrate individual frame virtual pixels for the mapping of FIG. 3. FIG. 4A illustrates the first virtual pixels 232 of the first frame and their mapping to physical LEDs. FIG. 4B illustrates the second virtual pixels 234 of the second frame and their mapping to physical LEDs. FIG. 4C illustrates the third virtual pixels 236 of the third frame and their mapping to physical LEDs. FIG. 4D illustrates the fourth virtual pixels 238 of the fourth frame and their mapping to physical LEDs.

Thus, as illustrated in FIG. 3 and seen more clearly in FIGS. 4A-4D, first virtual pixels 232 are in odd virtual rows (V-ODD, 230), second virtual pixels 234 are in odd virtual rows 230, third virtual pixels 236 are in even virtual rows (V-EVEN, 220), and fourth virtual pixels 238 are in even virtual rows 220. First virtual pixels 232 and second virtual pixels 234 alternate in the odd virtual rows 230. Similarly, third virtual pixels 236 and fourth virtual pixels 238 alternate in the even virtual rows 220.

In other words, in every frame 1, odd virtual rows 230 are displayed with first virtual pixels 232. In every frame 2, odd virtual rows 230 are displayed with second virtual pixels 234. In every frame 3, even virtual rows 240 are displayed with third virtual pixels 236. Finally, in every frame 4, even virtual rows 240 are displayed with fourth virtual pixels 138.

In FIGS. 3 and 4A-4D, the virtual pixels are mapped to different physical LEDs. One noticeable characteristic of this virtual pixel to physical LED mapping is the usage of the physical LEDs. Each physical LED in the odd LED rows 110 gets mapped to a virtual pixel in each three of the four frames. For example, looking at the middle odd LED row 110, the first blue LED is circled by a virtual pixel from each of frames 1, 2, and 4. The first red LED is circled by a virtual pixel from each of frames 1, 2, and 3. The second green LED is circled by a virtual pixel from each of frames 1, 2, and 4.

Similarly, each physical LED in the even LED rows 120 gets mapped to a virtual pixel in three of the four virtual frames. For example, in the first even LED row 120, the first red LED is circled by a virtual pixel from each of frames 2, 3, and 4. The first green LED is circled by a virtual pixel from each of frames 1, 3, and 4. The second blue LED is circled by a virtual pixel from each of frames 2, 3, and 4.

In another way to describe the virtual pixel to physical LED mapping, during frames 1 and 2, the virtual pixels include LEDs from the odd and even physical rows with a repeating pattern including a pixel of $^R_B{}^G$, a pixel of $^B_G{}^R$, and a pixel of $^G_B{}^R$. During frames 3 and 4, the virtual pixels include LEDs from the odd and even physical rows with a repeating pattern including a pixel of $^R_B{}^G$, a pixel of $^B_G{}^R$, and a pixel of $^G_B{}^R$.

Figure 5:
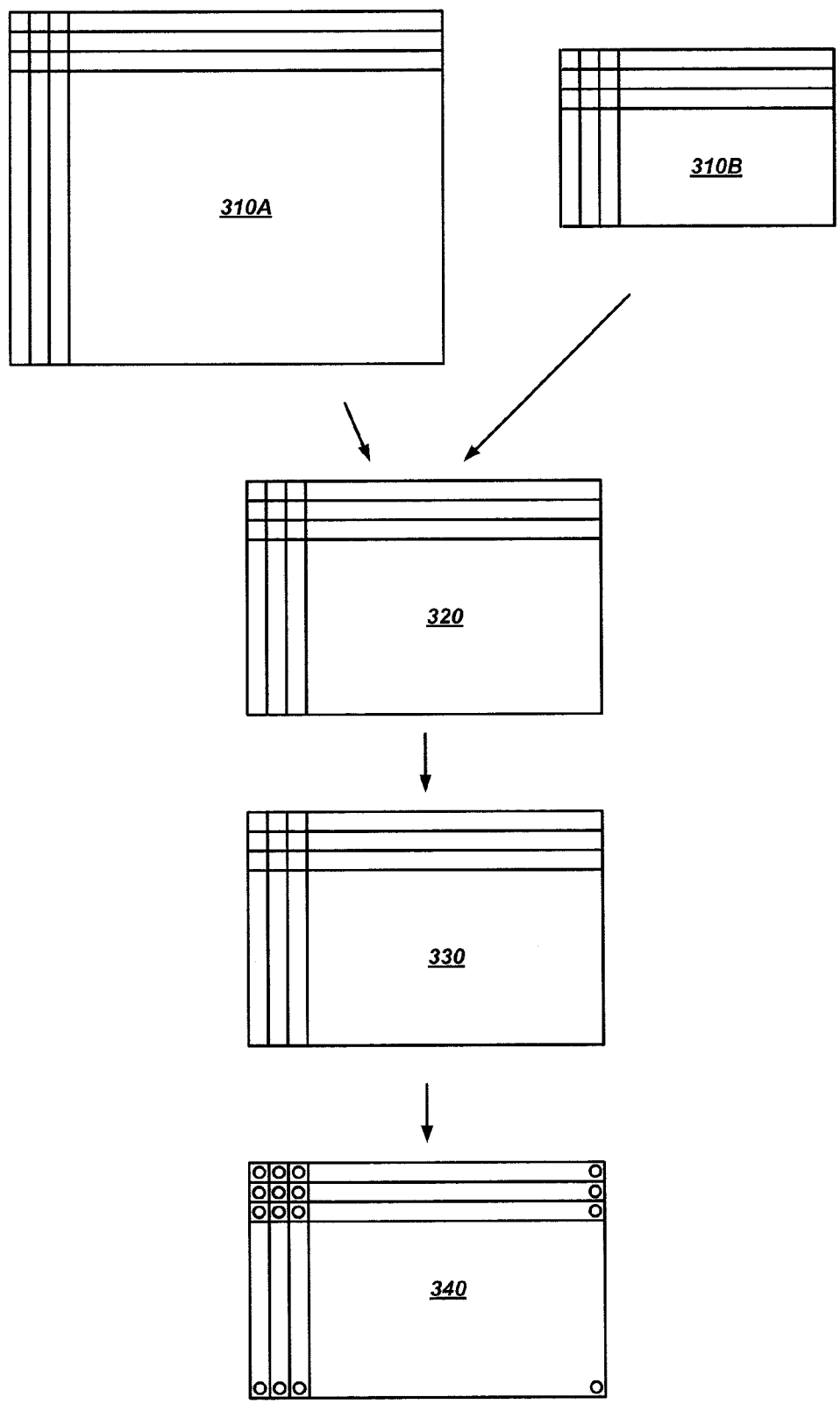
FIG. 5 illustrates various formats for visual content that may be used when processing the visual content for presentation on an LED display board.

FIG. 5 illustrates various formats for visual content that may be used when processing the visual content for presentation on an LED display board. An input image (310A or 310B) may be scaled such that the pixel layout and aspect ratio of the input image (310A or 310B) matches that of the array of virtual pixels 340 to be presented on the LED display board. A smaller input image 310B may be scaled up and a larger input image 310A may be scaled down to match the array of virtual pixels 340. This scaling process may not be necessary if the sizes already match.

The scaling may be any scaling algorithm, such as, for example, dropping pixels as a simple process to a high-quality bicubic scaling for a more complex process. The output of the scaling process is an input canvas image 320.

The input canvas image 320 may be processed to develop an output canvas image 330 by blending color information from various neighboring pixels as explained with reference to FIGS. 6A-6F. The output canvas image 330 contains the array of virtual pixels 340 that are to be mapped to the physical LEDs on the LED display board.

Thus, both the input canvas image 330 and the output canvas image 330 have enough detail (i.e., size) to allow for mapping of physical LED element positions that are spaced correctly relative to each other as they are on the actual LED display board.

FIGS. 6A-6F illustrates example pixel layouts that may be used to blend neighboring pixels with a specific pixel, which may produce a more visually pleasing result. Depending on the virtual pixel to physical LED mapping discussed above, and the content to be displayed, pixel blending may produce a more pleasing image on the display. For example, content containing streaming video may benefit from one type of blending, whereas content containing text may benefit from another type of blending. In addition, one type of blending may produce better results for a given virtual pixel to physical LED mapping than a different virtual to physical mapping.

Furthermore, different blending processes may be used for different segments of the visual content. For example, the visual content may include segments that contain text using one type of blending and other segments that contain video streams using a different type of blending.

In FIGS. 6A-6F, the pixel with the circle is a subject pixel and a pixel with an "X" is a blending pixel used in the blending. The blending process takes the intensity for each color of the subject pixel and blends intensity for each color of each of the blending pixels to create an output canvas image pixel at the subject pixel location. Each blending pixel may be assigned a different weighting when it is combined with the subject pixel to accomplish different effects and possibly give more weight to blending pixels that are nearer to the subject pixel. The process is repeated using each pixel of the input canvas image as a subject pixel to create the entire array of virtual pixels in the output canvas image.

Figure 6A:
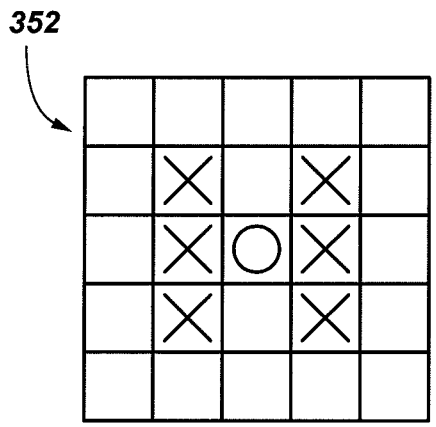
FIGS. 6A-6F illustrate examples of pixel layouts that may be used to blend neighboring pixels with a specific pixel, which may produce a more visually pleasing result.
Figure 6B:
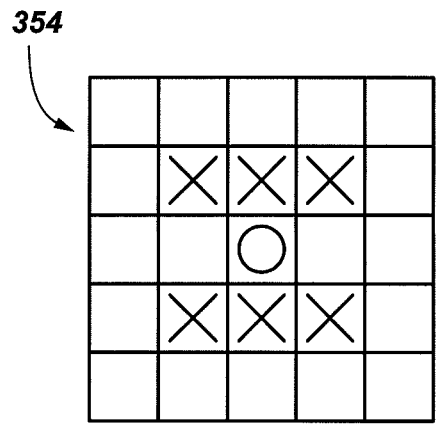

FIG. 6A illustrates an H map 352 wherein neighboring pixels on each side of the subject pixel are used as blending pixels. The H pattern may be extended up, down, or a combination thereof to include additional blending pixels. FIG. 6B illustrates an I map 354 wherein neighboring pixels on a top side and a bottom side of the subject pixel are used as blending pixels. The I pattern may be extended to one side or both sides to include additional blending pixels.

Figure 6C:
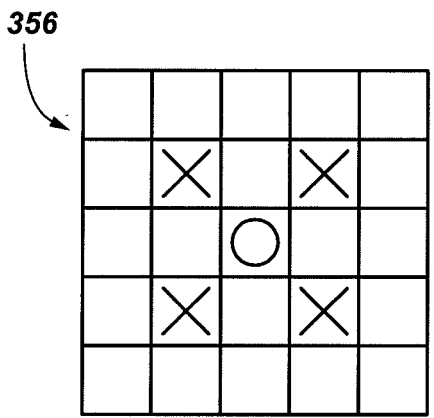
Figure 6D:
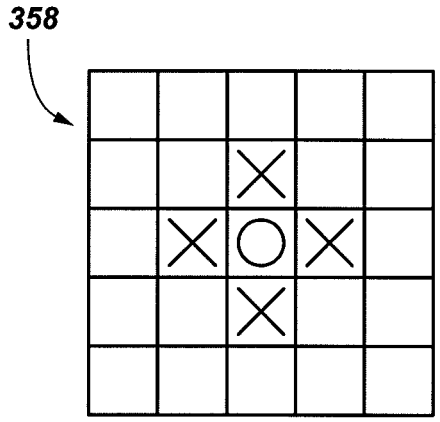

FIG. 6C illustrates an X map 356 wherein neighboring pixels on the corners of the subject pixel are used as blending pixels. The X pattern may be extended out away from the subject pixel to include additional blending pixels. FIG. 6D illustrates a cross map 358 wherein neighboring pixels on a top side, a bottom side, a left side and a right side of the subject pixel are used as blending pixels. The cross pattern may be extended out away from the subject pixel to include additional blending pixels.

Figure 6E:
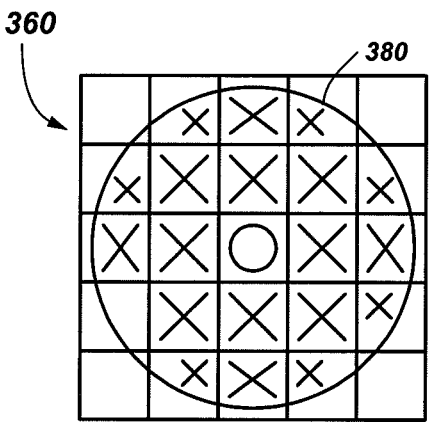
Figure 6F:
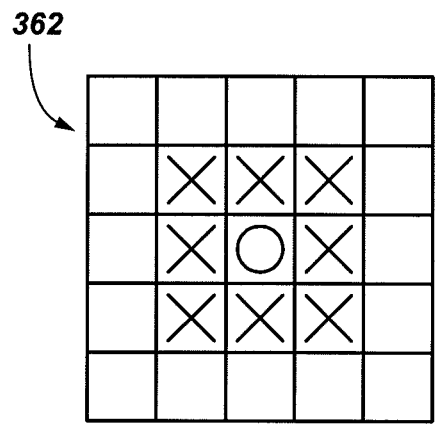

FIG. 6E illustrates an oval map 360, which pulls data from all blending pixels within an oval 380 about the subject pixel. The oval may be of varying size (i.e., encompassing a varying number of neighboring pixels) and, of course, may be considered a circle if both axes of the oval are the same length. FIG. 6F illustrates a rectangle map 362, which pulls data from all blending pixels within a rectangle about the subject pixel. The rectangle may be of varying size and, of course, may be considered a square if both axes of the rectangle are the same length.

Figure 7:
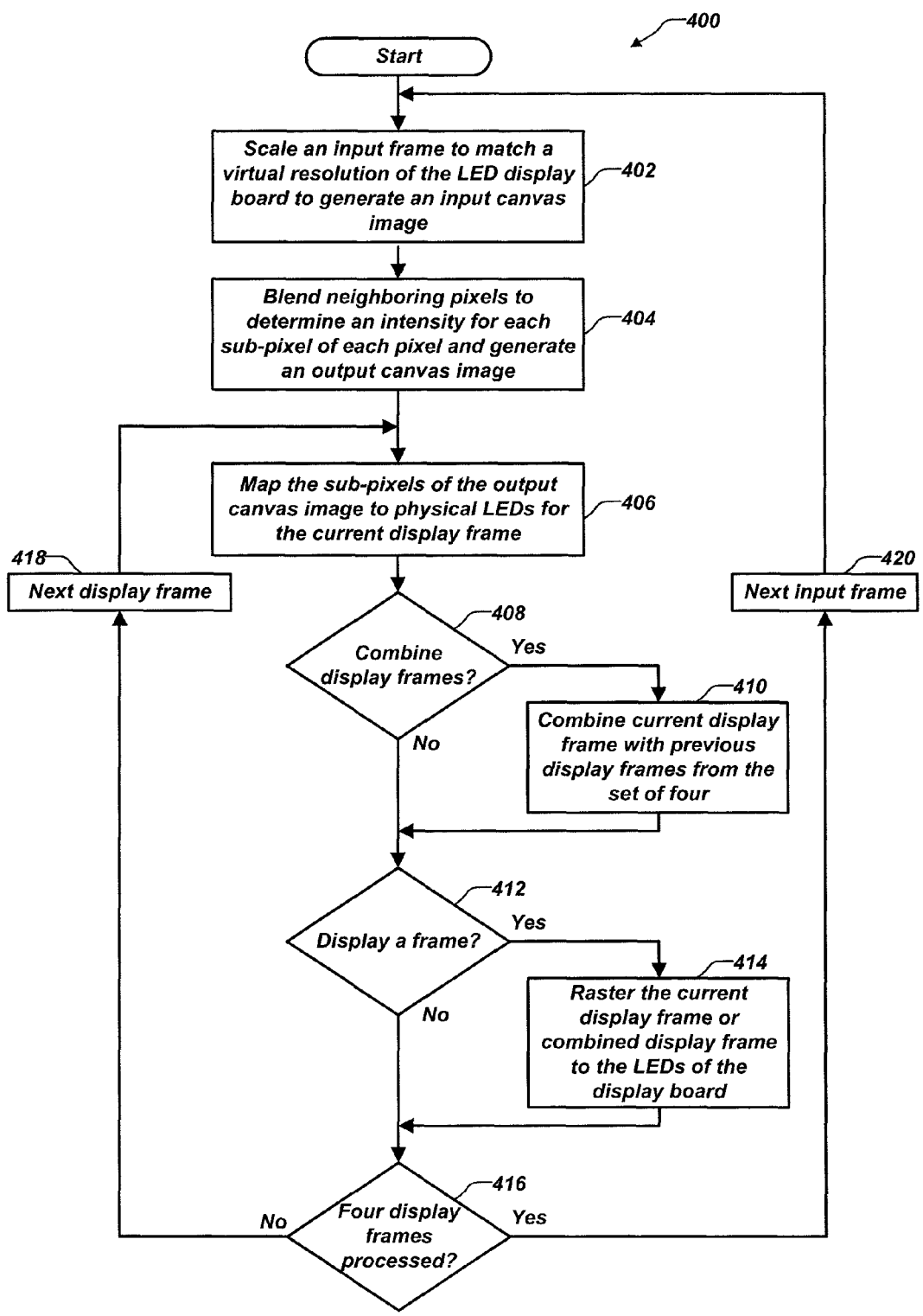
FIG. 7 is a simplified flow chart showing a process of mapping an input image to physical LED placements on an LED display board.

FIG. 7 is a simplified flow chart showing a process 400 of mapping an input image to physical LED placements on an LED display board. In describing the process 400, reference will be made to FIGS. 7 and 5. In operation block 402, an input frame may be scaled to match a virtual resolution of the LED display board. An input canvas image 320 is generated as a result of the scaling. In operation block 404, the input canvas image 320 may be processed to blend pixels with one of the maps discussed above with reference to FIGS. 6A-6F. An output canvas image 330 is generated from the blending process.

In operation block 406, the pixels of the output canvas image 330 may be mapped to the physical LEDs for the current frame of four frames as discussed above with respect to FIGS. 1-4D to generate an output image.

When multiple frames of images are viewed by the human eye, human perception may tend to integrate the pixels from temporally adjacent frames. As a result, multiple frames of still images tend to appear as smooth motion. Since this integration may be naturally performed by human perception, some embodiments of the present invention may take advantage of this perception by combining multiple subsequent frames together and displaying the frames less often.

As a non-limiting example, an input frame rate may be 60 frames/second, such that a group of four frames is displayed at a rate of 15 groups per second. Thus, some embodiments of the present invention may rasterize an individual frame to the display 60 times per second, combine every two temporally adjacent frames and rasterize the combined frames to the display 30 times per second, or combine four temporally adjacent frames and rasterize the combined frames to the display 15 time per second. Of course, embodiments of the present invention may include other frame rates and other numbers of frames to be combined.

The combination of temporally adjacent frames may be as simple as averaging the intensity values for each pixel from each frame to be combined. Other combinations may use more complex weighted averages for each of the corresponding pixels from different frames.

As a non-limiting example, in some embodiments, a frame to be displayed may combine multiple temporally adjacent frames such that there is an overlap of input frames relative to output frames. As a non-limiting example, an output frame may use a weighted average of four temporally adjacent input frames, yet the output frames are rasterized at one-half the frame rate of the input frames. Thus, as an example only, each pixel of an output frame may include: ¼F1+½F2+½F3+¼F4. Where F1-F4 are four temporally adjacent input frames. Then the next output frame may include ¼F3+½F4+½F5+¼F6. Of course, this is just one example of many types of temporal combinations and weightings that may be performed on the input images to reduce the frame rate on the actual output while maintaining an apparently higher frame rate to human perception.

Thus, decision block 408 determines if temporally adjacent frames are going to be combined. If so, operation block 410 combines the current frame with one or more previous frames, as discussed above.

Decision block 412 determines if a frame should be displayed on this time through the loop of display frames. In other words, as some examples, if the output frame rate were to match the input frame rate, decision block 412 would evaluate true every time through the loop. If the output frame rate were to be one-half the input frame rate, decision block 412 would evaluate true every other time through the loop. If the output frame rate were to be one-fourth the input frame rate, decision block 412 would evaluate true every fourth time through the loop.

In operation block 414, the output image for the current display frame or the combined display frame is rasterized to the LEDs of the display board depending on whether a combined display frame has been generated.

Decision block 416 tests to see if the last frame of the four frames for the current input frame has been processed. If not, operation block 418 sets the next display frame and the process loops through operations 406 through 414 to determine and rasterize the next frame of the output image. If the last frame of the four frames for the current input frame has been processed, operation block 420 points to the next input frame and the process 400 repeats for the new input frame.

Some of the operations may be skipped in various embodiments of the present invention. For example, the scaling process of operation block 402 may not need to be performed. In another example the blending process of operation block 404 may not be desired, or may only be performed on portions of the input canvas image.

Figure 8A:
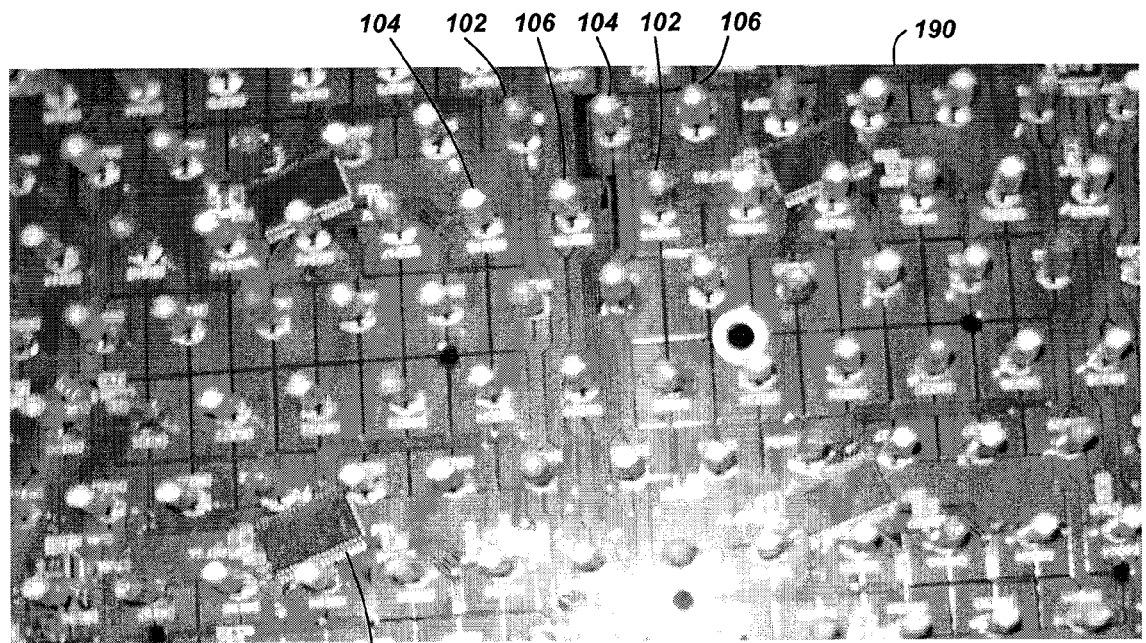
FIGS. 8A-8C show portions of an LED display board showing placement of various colors of LEDs and edges of LED display boards.
Figure 8B:
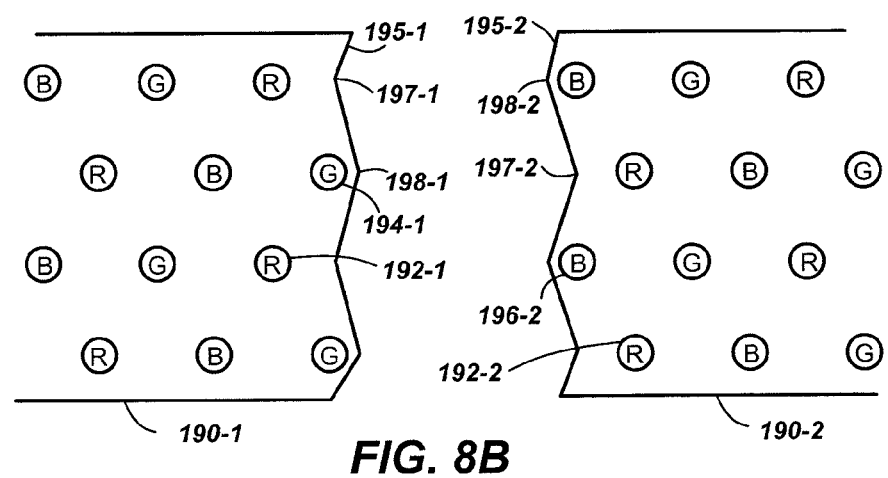
Figure 8C:
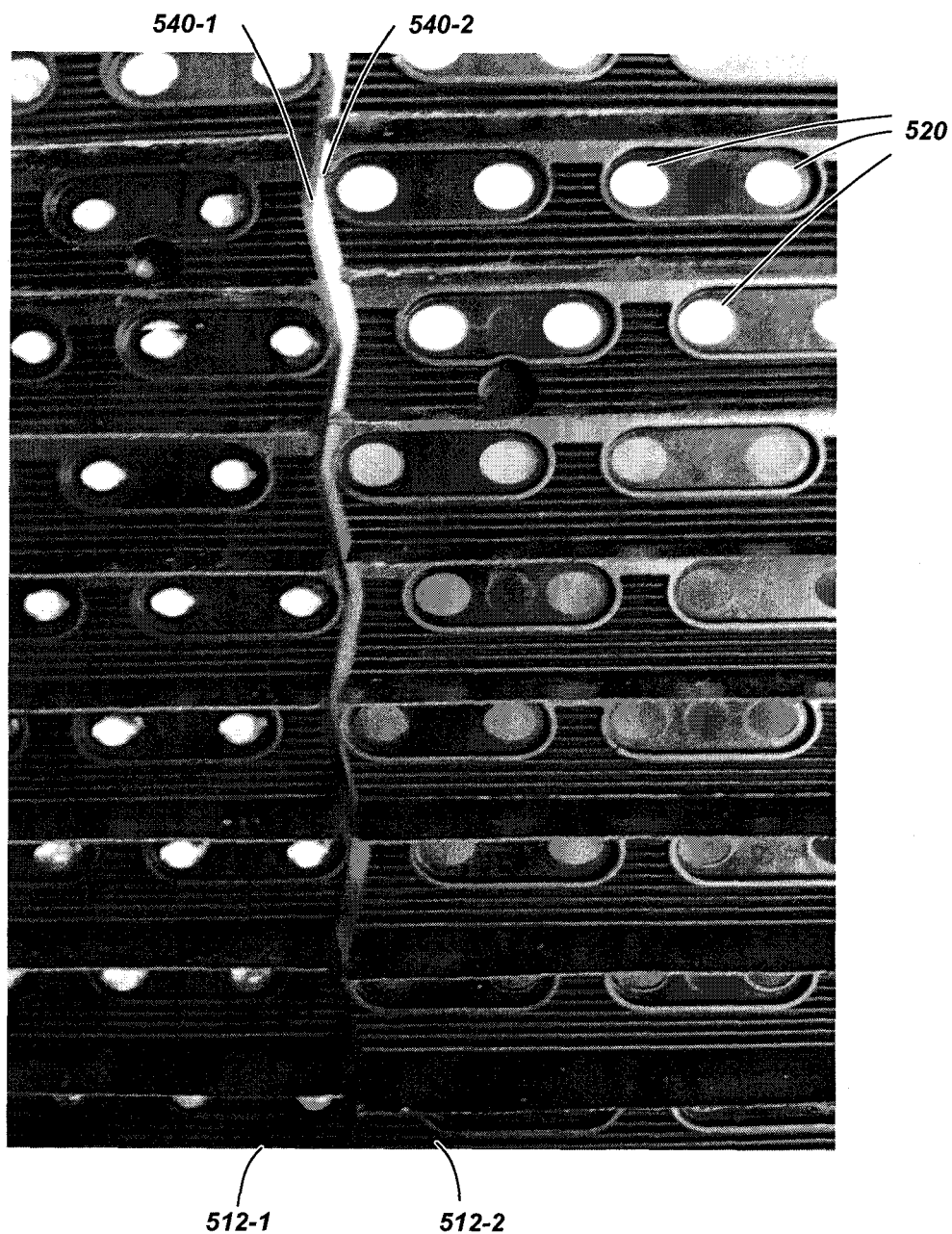

FIGS. 8A-8C show portions of an LED display board showing placement of various colors of LEDs and edges of LED display boards and removable panels. FIG. 8A shows a portion of an LED display board 190 showing placement of various colors of LEDs, such as red LEDs 102, green LEDs 104, and blue LEDs 106. Also shown are driver integrated circuits 195 that may be used to drive and control LEDs near the driver integrated circuit 195.

FIG. 8B shows portions of two LED display boards (190-1 and 190-2) to shown corrugated edges (195-1 and 195-2) that are abutted together when the LED display boards (190-1 and 190-2) are combined to create a large display. The corrugated edges (195-1 and 195-2) include alternating ridges (198-1 and 198-2) and furrows (197-1 and 197-2). These corrugated edges (195-1 and 195-2) are configured such that an LED may be positioned in the ridges. As a non-limiting example, blue LEDs 196-2 are positioned in the ridges 198-2 of the second LED display board 190-2 (also referred to herein as even LED display boards). Similarly, green LEDs 198-1 are positioned in the ridges 198-1 of the first LED display board 190-1 (also referred to herein as odd LED display boards). In the embodiment shown in FIGS. 8B and 8C, red LEDs (192-1 and 192-2) are positioned in the furrows of both the odd LED display boards 190-1 and the even LED display boards 190-2).

FIG. 8C shows portions of two removable panels (512-1 and 512-2) to shown panel corrugated edges (540-1 and 540-2) that are abutted together when the removable panels (512-1 and 512-2) are combined to create a large display. Additional details of the removable panels are described below with reference to FIGS. 9-12. The panel corrugated edges (540-1 and 540-2) include alternating ridges and furrows in a manner similar to the LED display boards (190-1 and 190-2) of FIG. 8B. The removable panels (512-1 and 512-2) are configured to accept the LED display boards (190-1 and 190-2) such that the LEDs protrude through the apertures 520 in the removable panels (512-1 and 512-2). The corrugated edges (195-1 and 195-2) on the LED display boards, and the panel corrugated edges (540-1 and 540-2) are configured such that pixel spacing between boards maintains the same distances as the pixel spacing within boards when the removable panels (512-1 and 512-2) including the LED display boards (190-1 and 190-2) are abutted.

FIGS. 8B and 8C show the corrugated edges of ridges and furrows comprised of angled edges. However, other corrugated edges are possible. As non-limiting examples, the corrugated edges may comprise rectilinear teeth that are configured to mesh together or undulating curves that are configured to mesh together.

Figure 9:
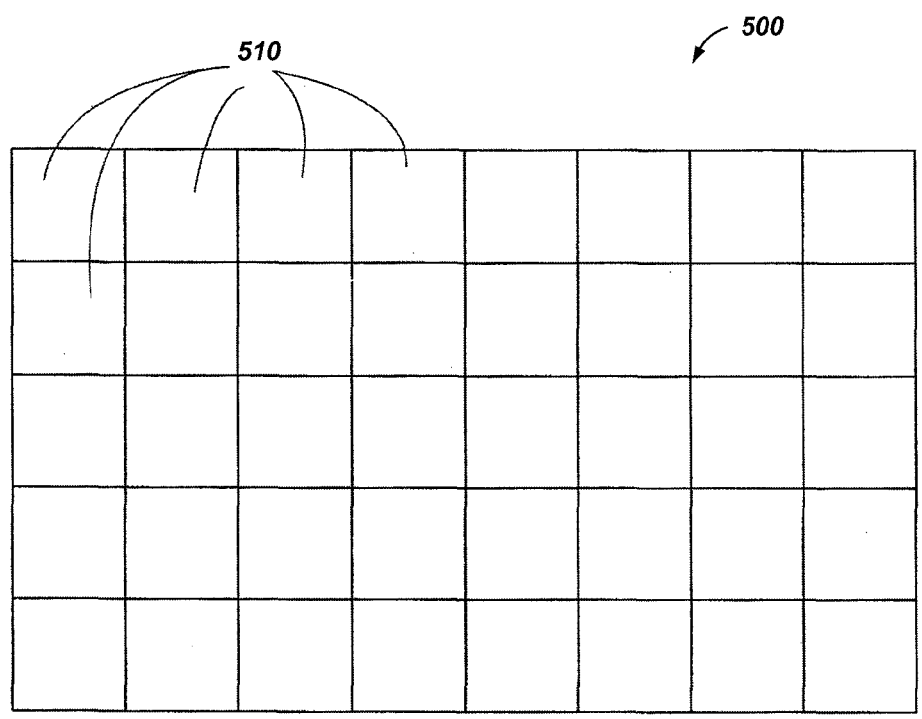
FIG. 9 illustrates a simplified view of plurality of removable panels arranged in a matrix organization.
Figure 10:
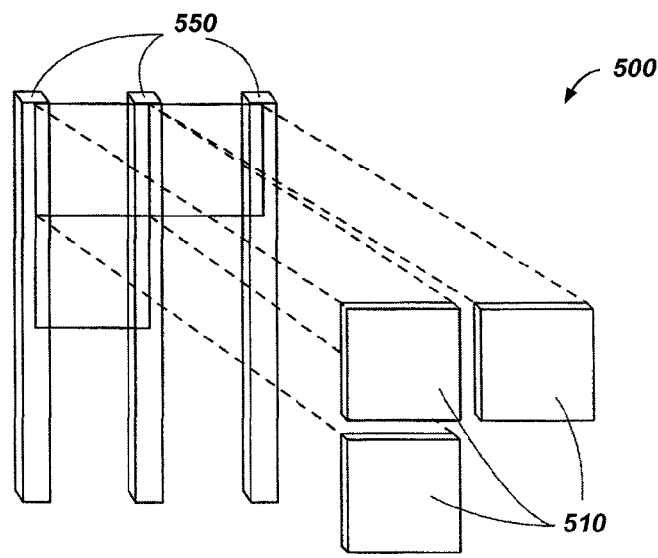
FIG. 10 illustrates an exploded view of removable panels for attachment to frame members.

FIG. 9 illustrates a simplified view of plurality of removable panels arranged in a matrix organization. An electronic display 500 (such as an LED display board) may include a single display module 510, or, as illustrated in FIGS. 9 and 10, an electronic display 500 may include a plurality of display modules 510 arranged in a matrix organization. Additionally, these display modules 510 may be arranged in a variety of configurations for different applications. For example, the matrix organization may include a single row of display modules 510 (or a single column of display modules 510) for creating a narrow yet long display, which may be suitable for displaying messages in a traveling ticker-tape type of arrangement. A small number of display modules 510 may be used to create a relatively small electronic display 500, or a large number of display modules 510 may be arranged to create a relatively large electronic display 500. By way of example and not limitation, a relatively large billboard size electronic display 500 may include a matrix organization of 1100 or more display modules 510 in a rectangular configuration. Additionally, using a plurality of display modules 510 to form a larger electronic display 500 may allow for the easier maintenance, installation, and removal of the electronic display 500. For example, each display module 510 of the electronic display 500 may be readily removed and replaced.

FIG. 10 illustrates an exploded view of removable panels for attachment to frame members 550. A plurality of display modules 510 may be attached to frame members 550 as part of the electronic display 500. The frame members 550 may extend vertically and each module 510 may be placed in a removable panel position such that it abuts a neighboring display module 510 horizontally. The display modules 510 also may be stacked vertically to form the overall electronic display 500 for presenting the visual content. The overall electronic display 500 may be configured to display visual content, such as for example, a series of still images, or a video image. In many embodiments, which include many display modules 510, each display module 510 may be configured to form only a relatively small portion of the overall visual content.

Figure 11:
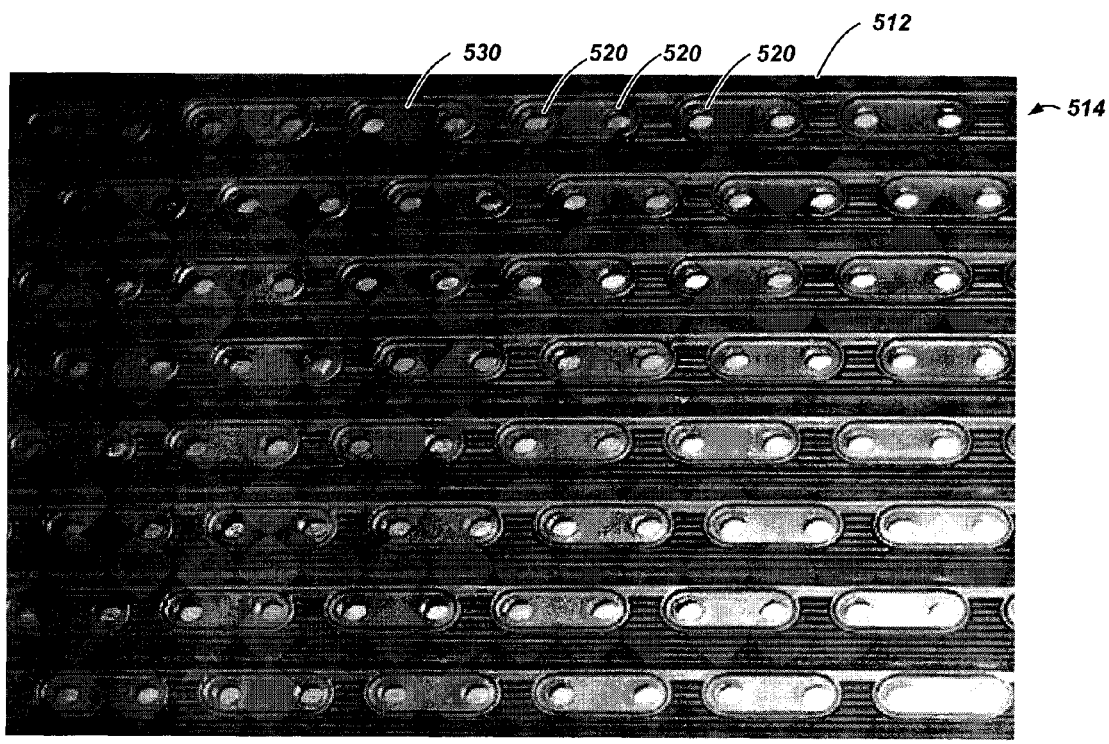
FIG. 11 is a close-up view of a removable panel.
Figure 12:
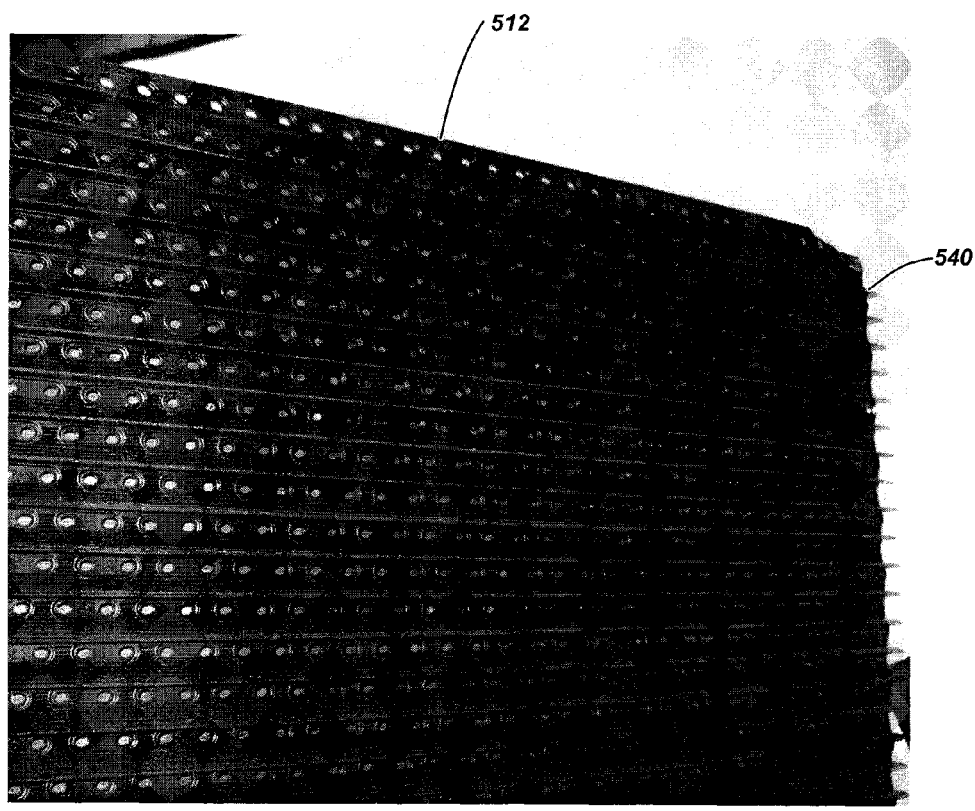
FIG. 12 is a perspective view of the removable panel.

Each display module 510 (FIG. 10) includes a removable panel 512, as shown in FIGS. 11 and 12. FIG. 11 illustrates a front view of an embodiment of removable panel 512 for a display module 510, and FIG. 12 illustrates a perspective view of the removable panel 512 shown in FIG. 11.

Each display module 512 includes one or more pixel rows 514 comprising a plurality of pixel arrangements 530 positioned and configured to display at least a portion of the visual content. The removable panel 512 may further comprise horizontal fins 540. Each pixel row 514 may include a plurality of pixel arrangements 530, and each pixel arrangement 530 may include one or more apertures 520. For example, each pixel arrangement 530 may include two apertures 520 for receiving LEDs on a display board 190 as shown in FIG. 8. The removable panel 512 is illustrated with a plurality of pixel rows 514. However, the removable panel 512 also may be formed having only a single pixel row 514. Additionally, the removable panel 512 may be formed having any number of pixel arrangements 530 and may include different pixel row geometries as well as different overall geometries.

Electronic displays 500 may take on a number of forms and formats. By way of example, and not limitation, electronic displays 500 may be in the form of billboards, displays on busses, displays on bus shelters, mall directory signs, airport signs, signs in sporting and other event arenas, signs on taxis, and any other place where displays are used for advertising.

The visual content to be presented on the displays may be formatted in any suitable format for presenting and transmitting video, still-images, and text. By way of example, and not limitation, some of the formats may include ASCII text, graphic interchange formats (GIF), bitmap (BMP) formats, Joint Photographic Experts Group (JPEG) formats, Moving Picture Experts Group (MPEG) formats, and the like. Also as non-limiting examples, the visual content may include animations, Really Simple Syndication (RSS) feeds, web pages, time of day, temperature, stock quotes, emergency information, eXtensible Markup Language (XML) files, data files, Hyper-Text Markup Language (HTML) files, and combinations thereof.

In addition, the electronic displays 500 may include audio content through an audio output (not shown). The audio content may be formatted in any suitable format for presenting and transporting audio. By way of example, and not limitation, some of the formats may include MPEG-3 (MP3), wave (WAV) windows media audio (WMA), Advanced Audio Coding (AAC), and the like.

Figure 13:
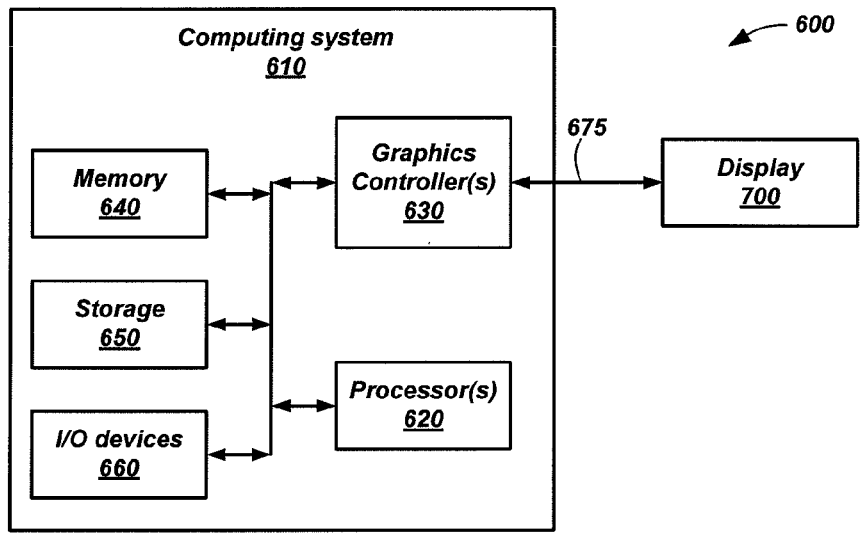
FIG. 13 is a simplified block diagram of a display system including a computing system.

FIG. 13 is a simplified block diagram of a display system 600 including a computing system 610 and a display 700 coupled to the computing system 610. The computing system 610 is configured for executing software programs containing computing instructions and includes one or more processors 620. The computing system 610 may also include memory 640, storage 650, one or more Input/Output (I/O) elements 660, and one or more graphics controllers 630.

The one or more processors 620 may be configured for executing a wide variety of operating systems and applications including computing instructions for carrying out embodiments of the present invention.

The memory 640 may be used to hold computing instructions, data, and other information for performing a wide variety of tasks including performing embodiments of the present invention. By way of example, and not limitation, the memory 640 may include Synchronous Random Access Memory (SRAM), Dynamic RAM (DRAM), Read-Only Memory (ROM), Flash memory, and the like.

The storage 650 may be used for storing large amounts of non-volatile information for use in the display system 600 and may be configured as one or more storage devices. By way of example, and not limitation, these storage devices may include computer-readable media (CRM). This CRM may include, but is not limited to magnetic and optical storage devices such as disk drives, magnetic tapes, CDs (compact disks), DVDs (digital versatile discs or digital video discs), and other equivalent storage devices.

The I/O elements 660 may be any suitable input output devices such as displays, keyboards, mice, and communication elements. The I/O elements 660 may be configured for communicating with other devices or communication networks. By way of example, and not limitation, the I/O elements 660 may include elements for communicating on wired and wireless communication media, such as for example, serial ports, parallel ports, Ethernet connections, universal serial bus (USB) connections IEEE 1394 ("firewire") connections, bluetooth wireless connections, 802.1 a/b/g/n type wireless connections, and other suitable communication interfaces and protocols.

A graphics communication bus 675 is operably coupled to the computing system 610. The graphics communication bus 675 may be used for sending control information from the computing system 610 to the display 700. In addition, graphical information may be communicated between the computing system 610 and the display 700 on the graphics communication bus 675 (also may be referred to herein as a display bus 675). The graphics communication bus 675 may be operably coupled with the graphics controller 630. However, in some embodiments there may not be a graphics controller 630 and the graphics control function may be performed by the processor 620. In still other embodiments, the graphics controller 630 may be embedded in the processor 620.

As non-limiting examples, the graphics communication bus 275 may be a Video Graphics Array (VGA) bus, a Digital Video Interface (DVI) bus, a High Definition Media Interface (HDMI) bus, a Serial Digital Interface (SDI) bus, or other communication bus suitable for transmitting graphical frame information.

By way of non-limiting example, computing instructions for performing the processes may be stored on the storage 650, transferred to the memory 640 for execution, and executed by the processor 620, the graphics controller 630, the display 700, or combinations thereof. The processor 620, graphics controller 630, and display 700, when executing computing instructions configured for performing the processes, constitutes structure for performing the processes. In addition, some or all portions of the processes may be performed by hardware specifically configured for carrying out the processes.

Figure 14:
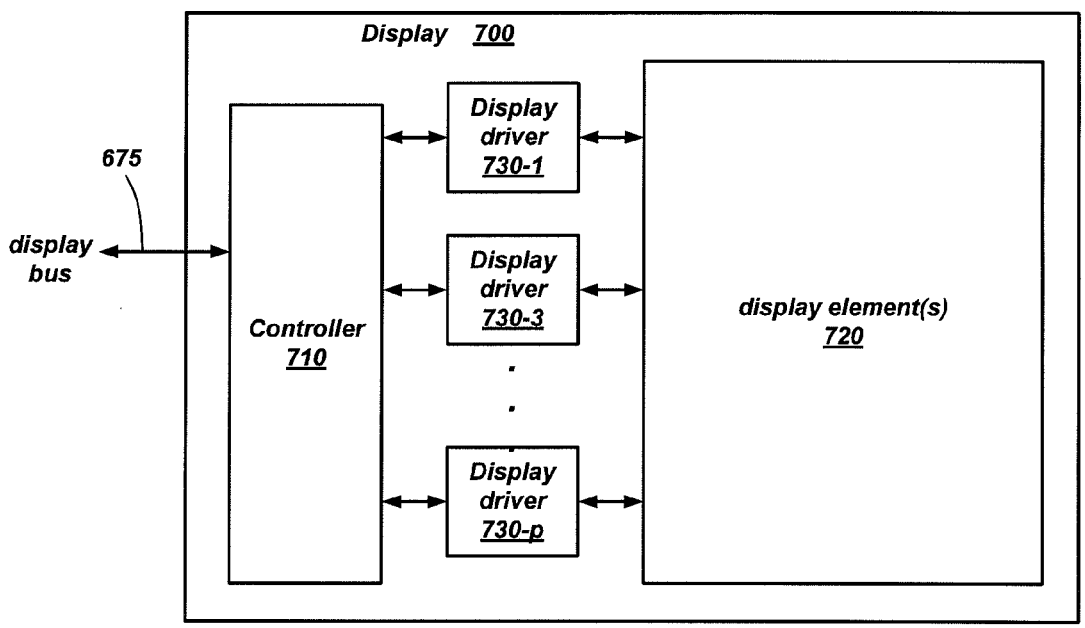
FIG. 14 is a simplified block diagram of a display for use with the display system of FIG. 13.

FIG. 14 is a simplified block diagram of a display 700 for use with the display system 600 of FIG. 13. Each display 700 may include a controller 710, one or more display drivers (730-1 through 730-$p$), and one or more display elements 720. The display controller may be configured for receiving media content, determining which media content is for the display elements present on that display 700. The controller 710 may also include functions such as, for example, formatting the content for its electronic display 700, animating the content for its electronic display 700, controlling presentation of audio content on audio elements, controlling timing of various content on the display element 700, controlling timing of various content on the audio element, and communicating with the computing system 610.

The display elements 720 may be configured as LED display boards 190 with LEDs, as shown in FIG. 8. Furthermore, the display elements may be partitioned into sections, such that each section may be controlled by a separate display driver 730. As a non-limiting example, in FIG. 14, display driver 730-1 may control an upper strip of the display elements 720, display driver 730-2 may control a middle strip of the display elements 720, and display driver 730-$p$ may control a lower strip of the display elements 720. Of course, the segmentation may be in many different forms such as, for example, rectangular sections, horizontal strips, or vertical strips.

Although this invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. A method of presenting visual information on a LED display board, comprising:
    mapping an output canvas image comprising an array of virtual pixels to the LED display board comprising interleaved rows of LEDs wherein:
        odd LED rows of the interleaved rows of LEDs are offset relative to even LED rows of the interleaved rows of LEDs by about one-half the distance between adjacent LEDs in the interleaved rows of LEDs; and
        each of the odd LED rows and the even LED rows comprise a repeating pattern of a first color LED, a second color LED, and a third color LED; and
    combining at least two frames of a repeating sequence of four frames of the output canvas image to generate a presentation image, wherein:
        a first frame and a second frame of the four frames comprise alternating pixels from odd virtual rows of the output canvas image; and
        a third frame and a fourth frame of the four frames comprise alternating pixels from even virtual rows of the output canvas image;
    presenting the presentation image on the LED display board.

2. The method of claim 1, wherein the combining at least two frames of a repeating sequence of four frames comprises combining all of the four frames.

3. The method of claim 2, wherein combining all four frames comprises averaging corresponding pixels from each of the four frames.

4. The method of claim 1, wherein the first color LED is a substantially red color, the second color LED is a substantially green color, and the third color LED is a substantially blue color.

5. The method of claim 1, wherein the mapping the output canvas image further comprises mapping each virtual pixel of the array of virtual pixels to a corresponding display pixel of the LED display board comprising two corresponding LEDs in the odd LED row and a corresponding LED in an adjacent even LED row.

6. A method of presenting visual information on a LED display board, comprising:
mapping an output canvas image comprising an array of virtual pixels to the LED display board comprising interleaved rows of LEDs wherein:
odd LED rows of the interleaved rows of LEDs are offset relative to even LED rows of the interleaved rows of LEDs by about one-half the distance between adjacent LEDs in the interleaved rows of LEDs; and
each of the odd LED rows and the even LED rows comprise a repeating pattern of a first color LED, a second color LED, and a third color LED; and
presenting a repeating sequence of four frames of the output canvas image on the LED display board, wherein:
a first frame and a second frame of the four frames comprise alternating pixels from odd virtual rows of the output canvas image; and
a third frame and a fourth frame of the four frames comprise alternating pixels from even virtual rows of the output canvas image.

7. The method of claim 6, wherein the mapping the output canvas image further comprises mapping each virtual pixel of the array of virtual pixels to a corresponding display pixel of the LED display board comprising two corresponding LEDs in the odd LED row and a corresponding LED in an adjacent even LED row.

8. The method of claim 7, wherein a first LED row is an odd LED row and a first row of the output canvas image is an odd virtual row or an even virtual row.

9. The method of claim 7, wherein a first LED row is an even LED row and a first row of the output canvas image is an odd virtual row or an even virtual row.

10. The method of claim 6, wherein the mapping the output canvas image further comprises:
mapping each pixel of the first frame and the second frame to a corresponding display pixel in the LED display board comprising two corresponding LEDs in the odd LED row and a corresponding LED in an adjacent even LED row; and
mapping each pixel of the third frame and the fourth frame to a corresponding display pixel in the LED display board comprising two corresponding LEDs in the even LED row and a corresponding LED in an adjacent odd LED row.

11. The method of claim 6, further comprising scaling an input image comprising an array of input pixels to a size compatible with a size of the LED display board to generate the output canvas image.

12. The method of claim 6, further comprising generating the output canvas image by processing an input image comprising an array of input pixels to blend color information for each input pixel with color information from at least some neighboring pixels of the input pixel to generate a corresponding output canvas pixel for each input pixel.

13. The method of claim 6, further comprising:
scaling an input image comprising an array of input pixels to a size compatible with a size of the LED display board to generate an input canvas image comprising an array of input canvas pixels; and
generating the output canvas image, by processing each input canvas pixel to blend color information for the input canvas pixel with color information from at least some neighboring pixels of the input canvas pixel to generate a corresponding output canvas pixel for each input pixel.

14. The method of claim 13, wherein the neighboring pixels used in the processing form a blending pattern comprising at least one of an H map, an I map, a cross map, an X map, a rectangle map, or an oval map.

15. The method of claim 6, wherein the first color LED is a substantially red color, the second color LED is a substantially green color, and the third color LED is a substantially blue color.

16. A display configured as rows of LEDs, comprising:
an array of LEDs comprising:
a first set of rows in a first direction comprising first LEDs in a first repeating pattern comprising a first color LED, a second color LED, and a third color LED; and
a second set of rows in the first direction comprising second LEDs in a second repeating pattern comprising the first color LED, the second color LED, and the third color LED, wherein the second set of rows are interleaved between the first set of rows and the second LEDs are offset in the first direction relative to the first LEDs;
wherein visual content to be presented on the display comprises a repeating sequence of four frames of an array of virtual pixels such that each virtual pixel of the array comprises at least one of the first LEDs and at least one of the second LEDs.

17. The display of claim 16, wherein half the virtual pixels comprise two of the first LEDs and one of the second LEDs and the other half of the virtual pixels comprise two of the second LEDs and one of the first LEDs.

18. The display of claim 16, wherein the at least one of the first LEDs comprises two LEDs and the at least one of the second LEDs comprises one LED.

19. The display of claim 16, wherein each of the first LEDs is included in a virtual pixel in each of the four frames and each of the second LEDs is included in a virtual pixel in two of the four frames.

20. The display of claim 16, wherein each of the first LEDs is included in a virtual pixel in three of the four frames and each of the second LEDs is included in a virtual pixel in three of the four frames.

21. The display of claim 16, further comprising a processor configured for mapping an output canvas image comprising the array of virtual pixels to the first set of rows and the second set of rows.

22. The display of claim 21, wherein the processor is further configured for:
scaling an input image comprising an array of input pixels to a size compatible with a size of the display to generate an input canvas image comprising an array of input canvas pixels; and
generating the output canvas image by processing each input canvas pixel to blend color information for the input canvas pixel with color information from at least some neighboring pixels of the input canvas pixel.

23. The display of claim 22, wherein the neighboring pixels used in the processing form a blending pattern comprising at least one of an H map, an I map, a cross map, an X map, a rectangle map, or an oval map.

24. The display of claim 16, wherein the first color LED is a substantially red color, the second color LED is a substantially green color, and the third color LED is a substantially blue color.

25. A display configured as rows of LEDs, comprising:
an array of LEDs comprising:
a first set of rows in a first direction comprising first LEDs in a first repeating pattern comprising a first color LED, a second color LED, and a third color LED; and
a second set of rows in the first direction comprising second LEDs in a second repeating pattern comprising the first color LED, the second color LED, and the third color LED, wherein the second set of rows are interleaved between the first set of rows and the second LEDs are offset in the first direction relative to the first LEDs;
wherein visual content to be presented on the display comprises a repeating sequence of four frames of an array of virtual pixels such that each of the first LEDs is included in a virtual pixel in each of the four frames and each of the second LEDs is included in a virtual pixel in two of the four frames.

26. The display of claim 25, wherein half the virtual pixels comprise two of the first LEDs and one of the second LEDs and the other half of the virtual pixels comprise two of the second LEDs and one of the first LEDs.

27. The display of claim 25, wherein the virtual pixels comprise two of the first LEDs and one of the second LEDs.

28. The display of claim 25, further comprising a processor configured for mapping an output canvas image comprising the array of virtual pixels to the first set of rows and the second set of rows.

29. The display of claim 25, wherein the first color LED is a substantially red color, the second color LED is a substantially green color, and the third color LED is a substantially blue color.

30. A display configured as rows of LEDs, comprising:
an array of LEDs comprising:
a first set of rows in a first direction comprising first LEDs in a first repeating pattern comprising a first color LED, a second color LED, and a third color LED; and
a second set of rows in the first direction comprising second LEDs in a second repeating pattern comprising the first color LED, the second color LED, and the third color LED, wherein the second set of rows are interleaved between the first set of rows and the second LEDs are offset in the first direction relative to the first LEDs;
wherein visual content to be presented on the display comprises a repeating sequence of four frames of an array of virtual pixels such that each of the first LEDs is included in a virtual pixel in three of the four frames and each of the second LEDs is included in a virtual pixel in three of the four frames.

31. The display of claim 30, wherein half the virtual pixels comprise two of the first LEDs and one of the second LEDs and the other half of the virtual pixels comprise two of the second LEDs and one of the first LEDs.

32. The display of claim 30, wherein the virtual pixels comprise two of the first LEDs and one of the second LEDs.

33. The display of claim 30, further comprising a processor configured for mapping an output canvas image comprising the array of virtual pixels to the first set of rows and the second set of rows.

34. The display of claim 30, wherein the first color LED is a substantially red color, the second color LED is a substantially green color, and the third color LED is a substantially blue color.

35. A display configured as rows of LEDs, comprising:
a plurality of LED boards configured to be abutted in a first direction to form an LED display, each LED board of the plurality comprising:
a first corrugated side;
a second corrugated side on an opposite side from the first corrugated side, wherein the first corrugated side of even LED boards are configured to abut to the second corrugated side of odd LED boards; and
an array of LEDs comprising:
a first set of rows in the first direction comprising a first repeating pattern of a first color LED, a second color LED, and a third color LED; and
a second set of rows in the first direction comprising a second repeating pattern of the first color LED, the second color LED, and the third color LED;
wherein:
a first LED of the first set of rows is positioned substantially near a ridge of the first corrugated side and a last LED of the first set of rows is positioned substantially near a furrow of the second corrugated side; and
a first LED of the second set of rows is positioned substantially near a furrow of the first corrugated side and a last LED of the second set of rows is positioned substantially near a ridge of the second corrugated side.

36. The display of claim 35, further comprising a plurality of removable panels configured to be abutted in the first direction and to accept the plurality of LED boards, each removable panel comprising:
a first panel corrugated side corresponding to the first corrugated side;
a second panel corrugated side corresponding to the second corrugated side and on an opposite side from the first panel corrugated side, wherein the first panel corrugated side of even removable panels are configured to abut to the second panel corrugated side of odd removable panels.

37. The display of claim 35, wherein the first LED of the first set of rows of the even LED boards is a blue LED and the last LED of the second set of rows of the odd LED boards is a green LED.

38. The display of claim 35, further comprising a processor configured for mapping an output canvas image comprising an array of virtual pixels to the first set of rows and the second set of rows.

39. The display of claim 38, wherein the processor is further configured for:
scaling an input image comprising an array of input pixels to a size compatible with a size of the display to generate an input canvas image comprising an array of input canvas pixels; and
generating the output canvas image by processing each input canvas pixel to blend color information for the input canvas pixel with color information from at least some neighboring pixels of the input canvas pixel.

40. The display of claim 39, wherein the neighboring pixels used in the processing form a blending pattern comprising at least one of an H map, an I map, a cross map, an X map, a rectangle map, or an oval map.

41. The display of claim 35, wherein the first color LED is a red color, the second color LED is a green color, and the third color LED is a blue color.

* * * * *